United States Patent Office 2,800,797
Patented July 30, 1957

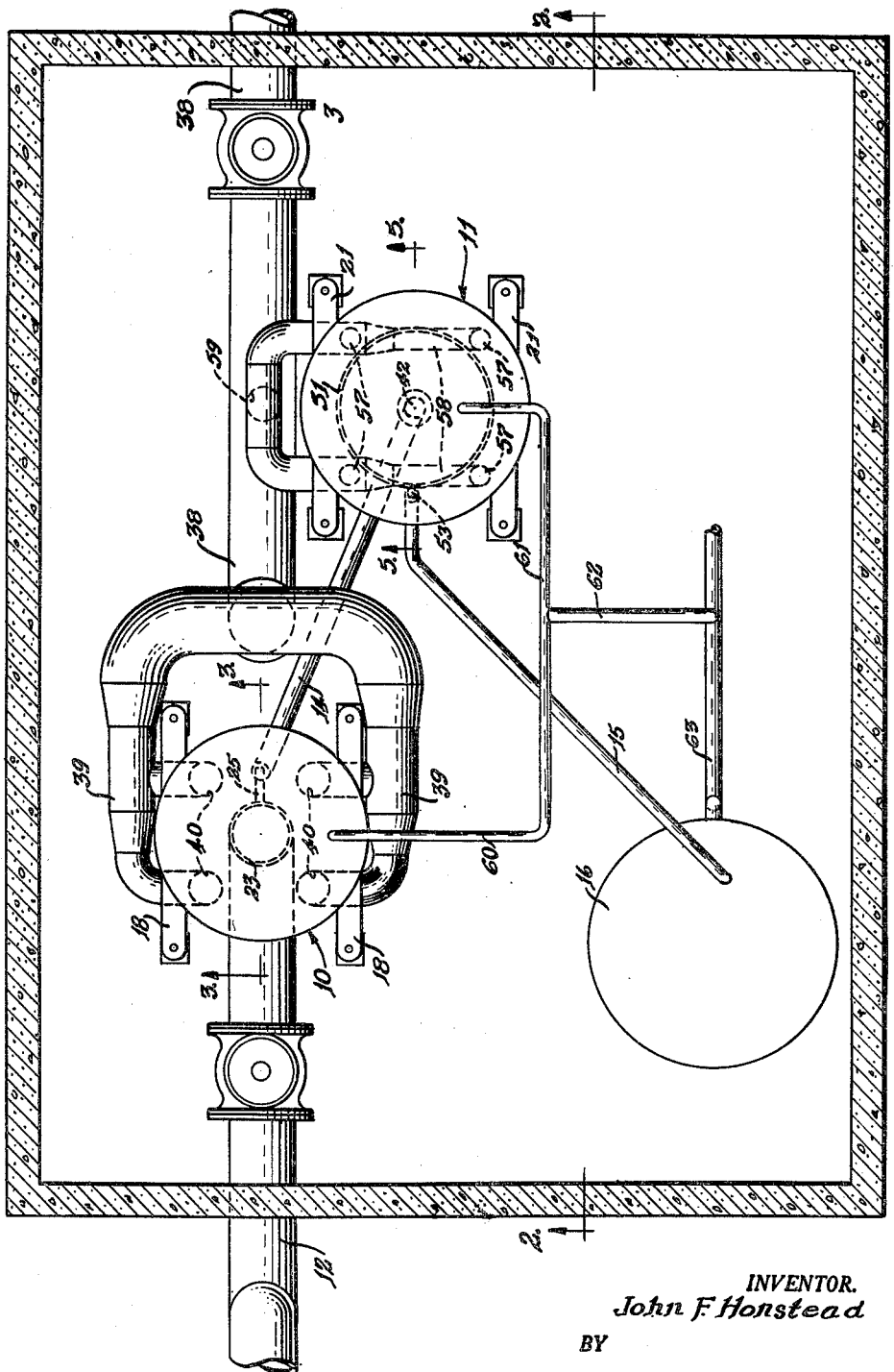

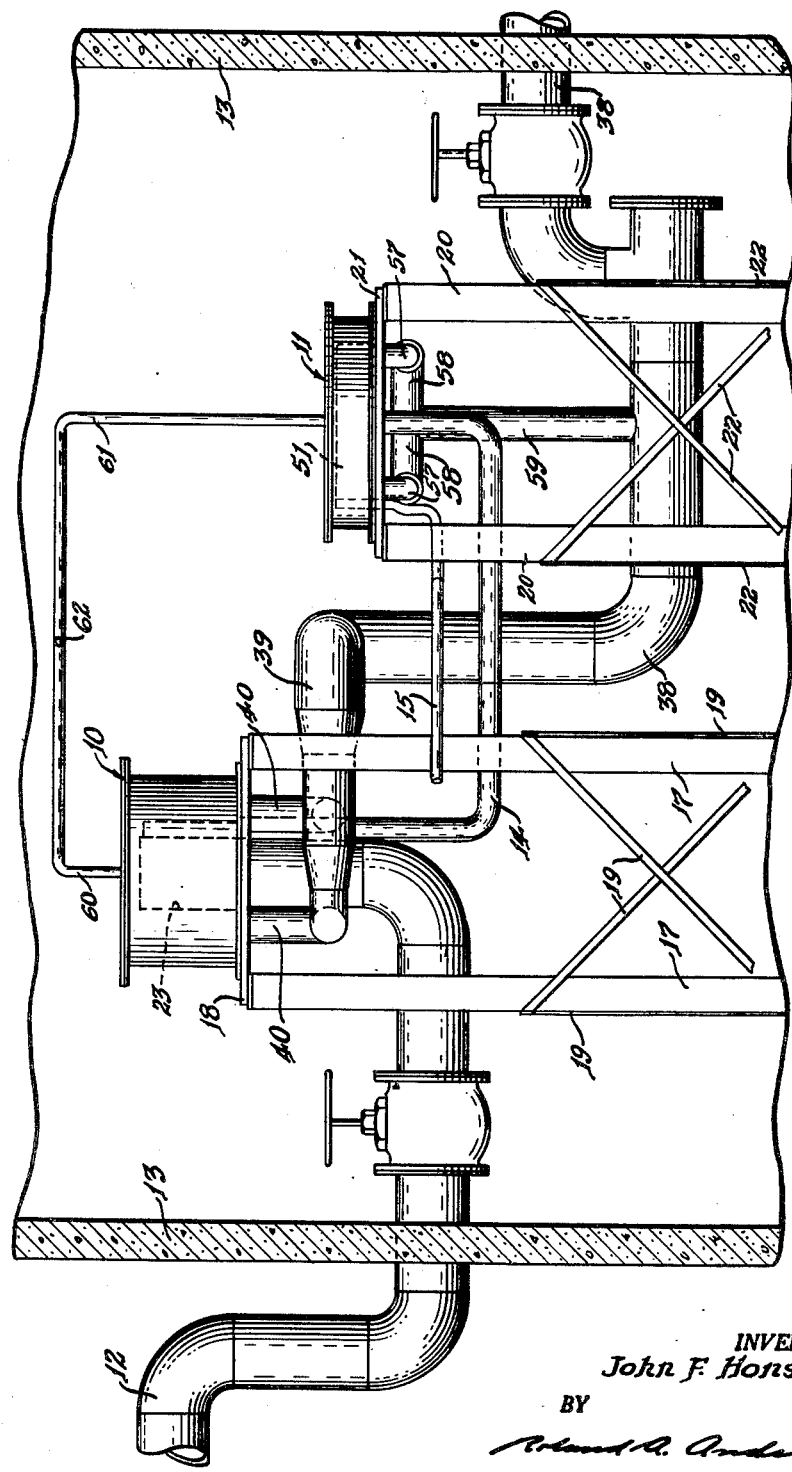

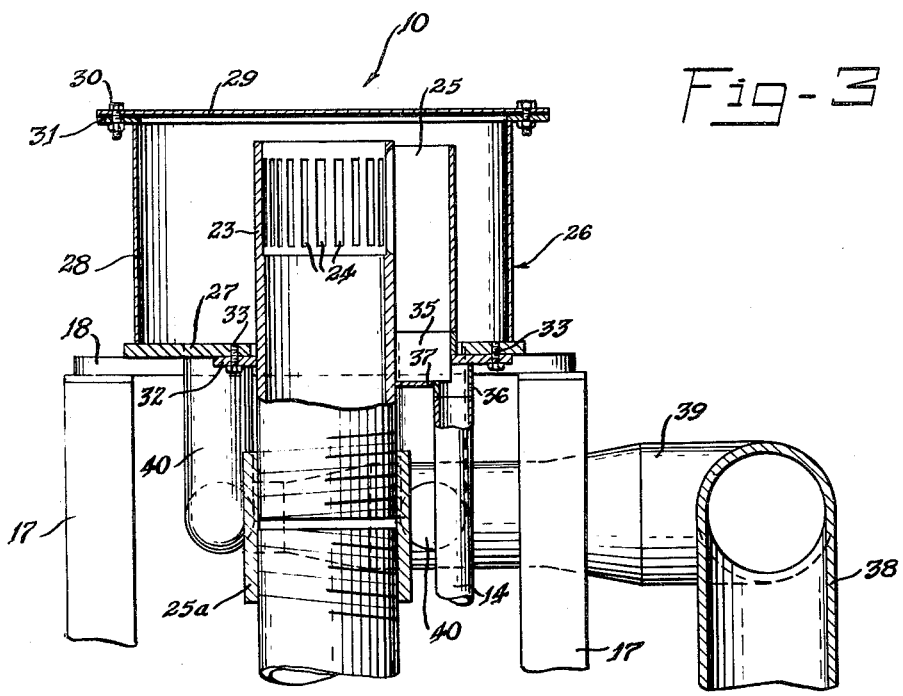
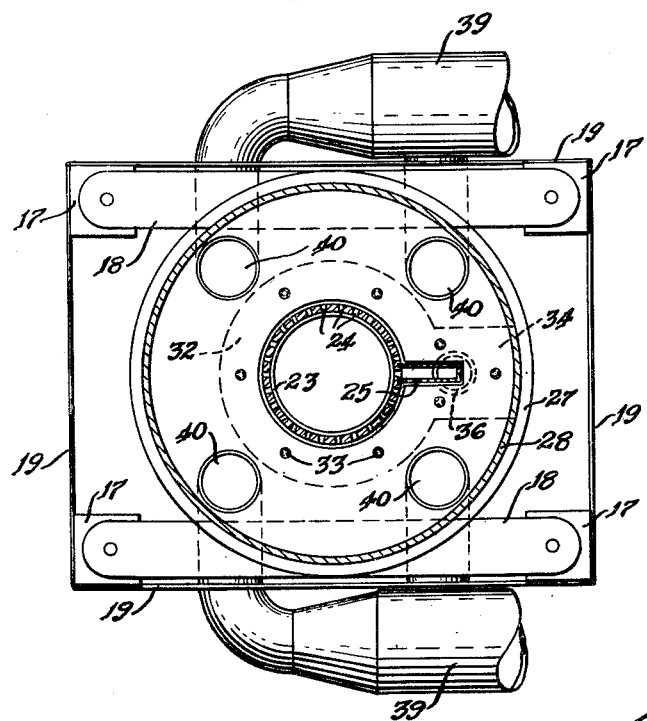

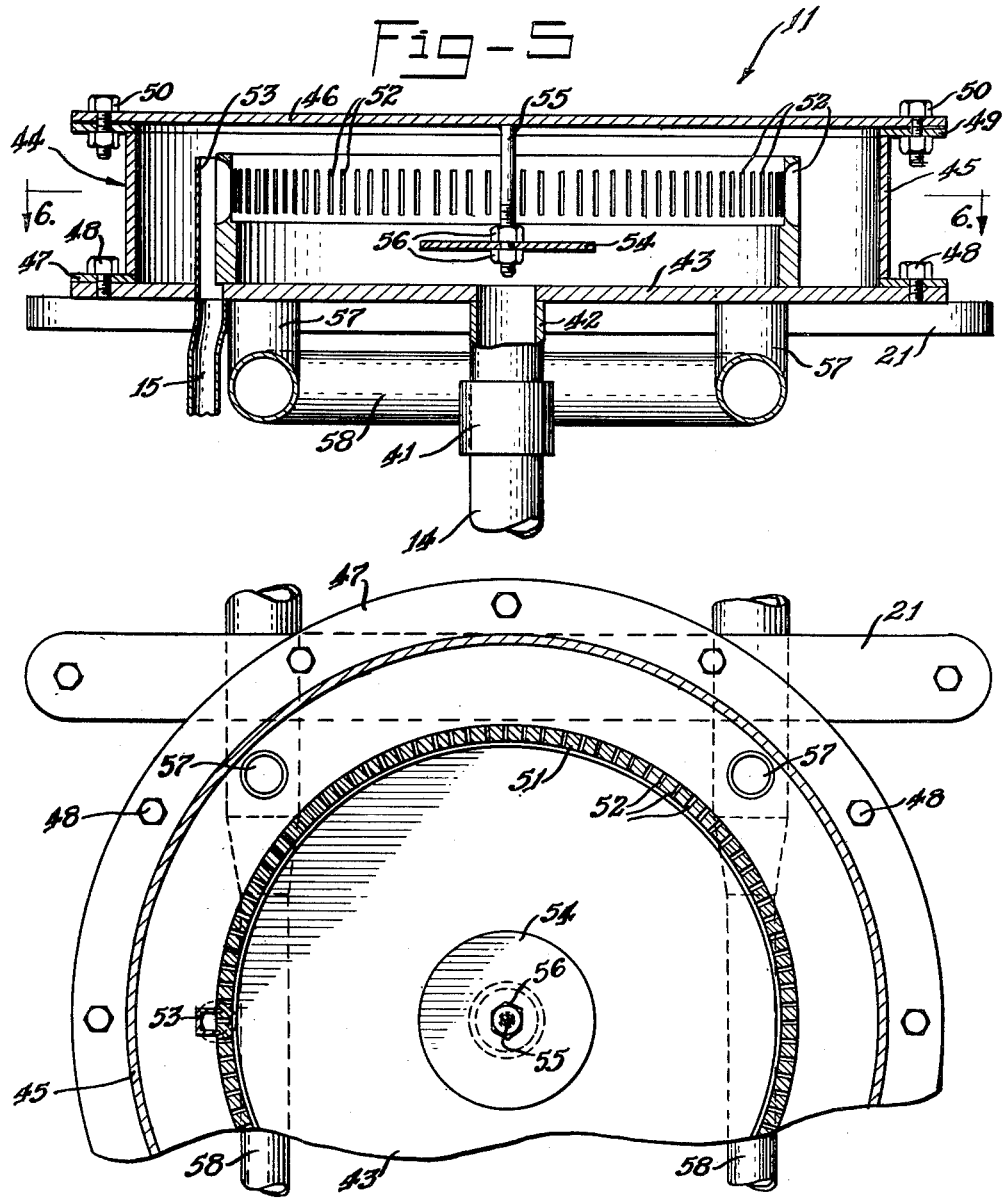

2,800,797

PROPORTIONAL WASTE LINE SAMPLER

John F. Honstead, Richland, Wash., assignor to the United States of America as represented by the United States Atomic Energy Commission Application January 11, 1956, Serial No. 558,599

1 Claim. (Cl. 73—421)

This invention relates to a sampling apparatus, and, more particularly, to an apparatus for taking a liquid sample from a waste line.

The problem in taking a sample is to assure that the sample is truly representative of the liquid flow both as to quality and as to quantity. This is relatively easy when the flow of liquid is smooth and uniform, but considerable difficulty may be encountered in obtaining a representative sample when the flow rate is high at one time and low at another.

The present sampling apparatus operates well regardless of the rate of flow or variation of such rate.

According to the present invention, a sampling line is connected to one of a large number of openings identical in size and arrangement to all of which the liquid to be sampled is presented in identical fashion and through all of which the liquid is flowed in equal quantities irrespective of the flow rate or changes in the flow rate.

In the drawings:

Fig. 1 is a plan view, partially in section, of an apparatus employing two samplers constructed in accordance with the present invention;

Fig. 2 is an elevational view, partially in section, taken on the line 2—2 of Fig. 1;

Fig. 3 is a vertical sectional view taken on the line 3—3 of Fig. 1 and illustrating one of the samplers;

Fig. 4 is a horizontal sectional view taken on the line 4—4 of Fig. 3;

Fig. 5 is a vertical sectional view taken on the line 5—5 of Fig. 1 and illustrating the other of the samplers; and Fig. 6 is a horizontal sectional view taken on the line 6—6 of Fig. 1.

As shown on Figs. 1 and 2, samplers 10 and 11 of the present invention are arranged to receive fluid to be sampled from a waste line 12. The samplers 10 and 11 are positioned in a concrete box 13 which is embedded in the ground, and the waste line 12 is buried in the ground and extends through a side wall of the box 13 up to the sampler 10. A sampling line 14 extends from the sampler 10 to the sampler 11, and a sampler line 15 extends from the sampler 11 to a sample tank 16. The sampler 10 is supported on vertical columns 17 and crosspieces 18 at the top of the columns. The columns 17 are supported on the base, not shown, of the box 13 and are reinforced by cross braces 19. The sampler 11 is supported on vertical columns 20 and crosspieces 21 at the top of the columns. The columns 20 are supported on the base of the box 13 and are reinforced by cross braces 22.

As shown in Fig. 3, the sampler 10 comprises essentially a circular cylindrical hollow member 23 having a large number of weir slots 24 and a U-shaped collector 25 applied to the exterior of the hollow member 23 over one of the slots 24. These slots, which may number twenty-five are identical in size and arrangement and are uniformly distributed about the hollow member 23 parallel to the axis thereof, which is vertical. The bottoms of the slots 24 are at the same level, as are also the tops, which are a short distance below the open upper end of the hollow member 23. The U-shaped collector 25 is soft-soldered to the hollow member 23 in exterior grooves thereon and has an open upper end just below the upper end of the hollow member. The lower end of the hollow member 23 is secured in abutting relation to a vertical portion on the end of the waste line 12 by means of a connector 25a.

The sampler 10 also includes a casing 26 in which the hollow member 23 and the collector 25 are positioned. The casing comprises a base plate 27, a circular side wall 28, and a top plate 29. The top plate is secured by bolts 30 to a ring 31, which is welded to the side wall 28. The side wall is welded to the base plate 27.

The hollow member 23 is supported in the casing 26 by means of a flange member 32 which is welded to the hollow member 23 and is attached to the base plate 27 by screws 33. As shown in Fig. 4, the flange member 32 has at one side an enlarged portion 34 which is slotted to receive a short U-shaped piece 35 aligned in abutting relation with the U-shaped collector 25 and engaging grooves in the hollow member 23. The sampling line 14 is secured to a tubular connector 36 which is notched so as to receive the outer lower corner of the piece 35 and abuts the enlarged portion 34 of the flange 32. The lower end of the piece 35 is closed by a cap 37 lying between the hollow member 23 and the sampling line 14. Thus the U-shaped collector 25 communicates at its lower end through the U-shaped piece 35 with the sampling line 14. Connections between the U-shaped piece 35, the flange member 32, the tubular connector 36, the cap 37 and the hollow member 23 are made by welding. The U-shaped collector 25 is soft-soldered to the hollow member 23 and the U-shaped piece 35 after the aforesaid welding connections have been made.

As shown in Figs. 1 and 2, a discharge line 38 has two horizontal branches 39, from each of which two vertical pipes 40 extend horizontally and then vertically to connections with openings in the base plate 27. The discharge line 38 goes through one side wall of the box 13 to the exterior thereof, where it is buried underground.

As shown in Fig. 5, one end of the sampling line 14 is attached by a connector 41 to a short tubular section 42 secured to a base plate 43 at a central opening formed therein. The base plate 43 forms part of a casing 44 which is part of the sampler 11 and which also comprises a circular side wall 45 and a top plate 46. The base plate 43 is secured to the side wall 45 by means of a ring 47 welded to the side wall 45 and screws 48 going through the ring 47 into threaded engagement with the base plate 43. The top plate 46 is secured to the side wall 45 by means of a ring 49 welded to the side wall 45 and bolts 50 going through the ring 49 and the top plate 46.

Essential features of the sampler are a circular cylindrical hollow member 51 provided with a large number of weir slots 52 and a U-shaped collector 53 secured in grooves on the exterior of the hollow member 51 over one of the weir slots 52. The weir slots, which may number a hundred, are identical in size and arrangement and are uniformly distributed about the hollow member 51 parallel to the axis thereof. The bottoms of the slots 52 are at the same level, as are also the tops, which are a short distance below the open upper end of the hollow member 51. The hollow member 51 is welded to the base plate 43 with the axis of the hollow member coincident with the center of the opening in the base plate. The U-shaped collector 53 is welded or soldered to the hollow member 51 and projects through an opening in the bast plate 43 to which the collector is soldered or welded. One end of the sampling line is soldered or welded in abutting relation to the collector 53. A disk 54 is adjustably suspended from the top plate 46 on a threaded rod 55. Two nuts 56 threaded on the rod 55 determine the spacing of the disk 54 from the opening in the base plate 43. As shown in Figs. 1 and 6, four vertical pipes 57 are secured to openings in the base plate 43 outward of the hollow member 51 and are connected to two horizontal branch lines 58. The branch lines 58 are connected to a vertical line 59 which is connected with the discharge line 38.

The liquid to be sampled flows through the waste line 12 up into the hollow member from which it exits through the weir slots 24, which are at the level of the horizontal portion of the waste line 12 outside of the box 13. The sample of the liquid going through the slot 24 at the collector 25 passes through the latter, the U-shaped piece 35, and the connector 36 into the sampling line 14. At the sampler 11 the sample exits from the line 14 through the tubular section 42 into the hollow member 51. The sample leaves the member 51 through the weir slots 52. A sample of the sample goes through the weir slot 52 at the collector 53, and thence through the collector 53 and the line 15 to the sample tank. The disk 54 prevents any sudden rush or surge of liquid through the line 14 from hitting the top plate 46 and escaping over the top of the hollow member 51, rather than through the slots 52.

In the sampler 10 the liquid that goes through the slots 24 except the one at the collector 25 exits from the casing 26 through the pipes 40 and then goes through the branches 39 into the discharge line 38. In the sampler 11 the liquid that goes through the slots 52 except the one at the collector 53 leaves the casing 44 through the pipes 57 and then goes through the branch lines 58 and the line 59 to the discharge line 38.

The significant thing about each of the samplers 10 and 11 is that the hollow member 23 or 51 with its weir slots 52 and the collector 25 or 53 takes the same relative amount of sample at all flow rates. It will be understood that, as the rate of flow of the liquid rises or falls, the level of the liquid in the hollow member 23 or 51 rises or falls with respect to the slots 24 or 52. It is immaterial just how the flow rate varies in relation to the height of the liquid at the weir slots, because the weir slots in each sampler are identical in size and arrangement so that regardless of the flow rate it is the same for all the slots. Thus the relative size of the sample taken at each of the samplers 10 and 11 remains the same for all flow rates.

Vent lines 60 and 61 lead from the top of samplers 10 and 11, respectively, to a line 62, which in turn leads to an overflow line 63 for the sample tank 16. The vent lines 60 and 61 can handle overflow from the samplers 10 and 11.

The intention is to limit the invention only in accordance with the appended claim.

What is claimed is:

A sampler comprising a hollow member open at its upper end and having a vertical axis and a plurality of identical weir slots uniformly distributed thereabout and extending along the axis, the slots having their lower ends at the same level, and a sampling line open at its upper end and connected with one of the weir slots exteriorly of the hollow member.

References Cited in the file of this patent

UNITED STATES PATENTS

| | | |
|---|---|---|
| 1,964,775 | Stuart | July 3, 1934 |
| 2,043,636 | Thompson | June 9, 1936 |
| 2,082,299 | Nonhebel | June 1, 1937 |